United States Patent [19]

Satou et al.

[11] 4,096,828
[45] Jun. 27, 1978

[54] ROTARY PISTON INTERNAL COMBUSTION ENGINE

[75] Inventors: Haruhiko Satou; Yoshinori Honiden; Motoyuki Hayashida; Mutsuo Wakamoto, all of Hiroshima, Japan

[73] Assignee: Toyo Kogyo Co. Ltd., Hiroshima, Japan

[21] Appl. No.: 676,783

[22] Filed: Apr. 14, 1976

Related U.S. Application Data

[63] Continuation of Ser. No. 325,979, Jan. 23, 1973, abandoned.

[30] Foreign Application Priority Data

| Jan. 24, 1972 | Japan | 47-10219 |
| Jan. 24, 1972 | Japan | 47-10220 |
| Jan. 24, 1972 | Japan | 47-10221 |
| Jan. 24, 1972 | Japan | 47-10222 |

[51] Int. Cl.² .............................................. F02B 53/10
[52] U.S. Cl. ...................................... 123/209; 123/211; 123/32 D; 123/32 SP; 123/32 ST; 123/32 C; 123/219
[58] Field of Search .................. 123/8.09, 8.13, 32 D, 123/32 C, 32 SP, 32 ST

[56] References Cited

U.S. PATENT DOCUMENTS

| 3,053,238 | 9/1962 | Meurer | 123/8.13 UX |
| 3,391,677 | 7/1968 | Hejj | 123/8.13 UX |
| 3,508,530 | 4/1970 | Clawson | 123/8.13 X |
| 3,683,868 | 8/1972 | Panhard | 123/8.09 |
| 3,976,036 | 8/1976 | Muroki | 123/8.09 |
| 4,009,688 | 3/1977 | Hayashida | 123/8.09 |

FOREIGN PATENT DOCUMENTS

| 947,284 | 1/1964 | United Kingdom | 123/8.09 |
| 995,101 | 6/1965 | United Kingdom | 123/8.13 |

Primary Examiner—Clarence R. Gordon
Attorney, Agent, or Firm—Sughrue, Rothwell, Mion, Zinn and Macpeak

[57] ABSTRACT

A rotary piston internal combustion engine of the Wankel type for reducing unburned detrimental components such as NOx, HC, CO, etc. in exhaust gas without decrease of engine performance which comprises a first combustion chamber communicating by means of a passage means with a second combustion chamber formed between a trochoidal inner peripheral surface of a housing and a side surface of a rotary piston, said first combustion chamber being formed radially outside of said trochoidal inner peripheral surface, the volume of said first combustion chamber being 35 to 65% of the sum of both said combustion chambers at the top dead center (T.D.C.) of the engine, a fuel injection nozzle and an ignition plug provided in said first combustion chamber, said passage means opening onto said trochoidal inner peripheral surface in the range of 15° before the junction of the two arcuate portions of said trochoidal inner surface to 30° after the junction in terms of the rotary angle of an eccentric shaft relative to said junction.

4 Claims, 1 Drawing Figure

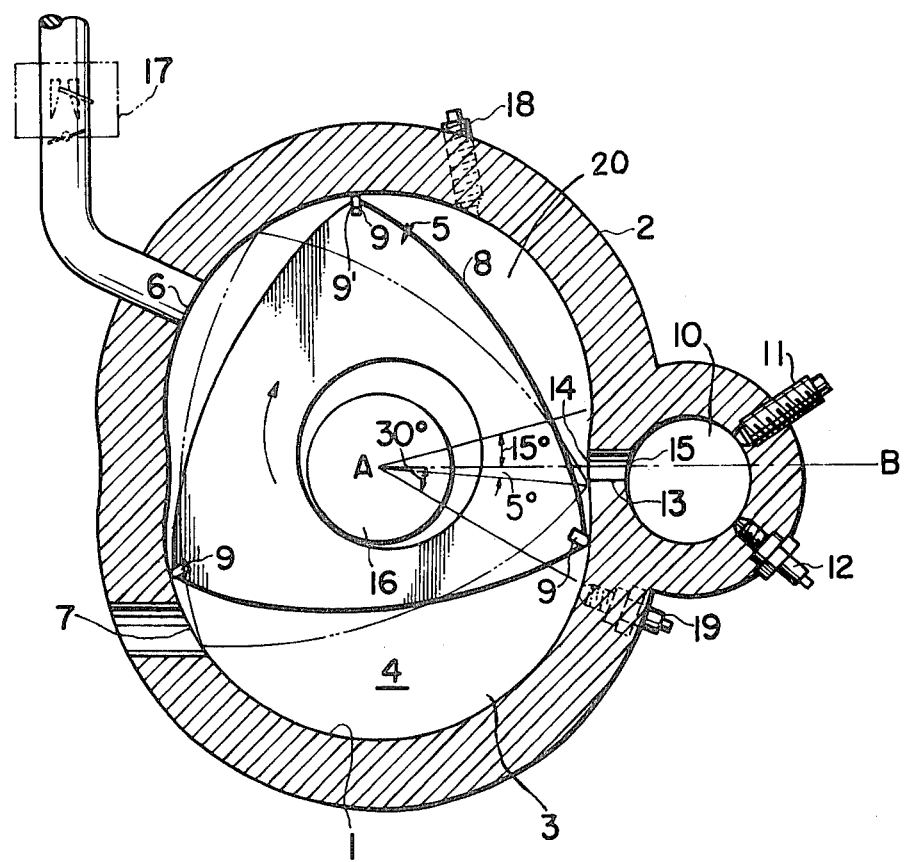

ROTARY PISTON INTERNAL COMBUSTION ENGINE

This is a continuation, of application Ser. No. 325,979, filed Jan. 23, 1973, now abandoned.

DISCLOSURE OF THE INVENTION

The present invention relates to a two-lobed and three-apexed rotary piston internal combustion engine of the Wankel type, and more particularly to a rotary piston internal combustion engine which has a first combustion chamber on the outside of the trochoidal inner peripheral surface provided with a fuel injection nozzle and an ignition plug in the chamber for reducing unburned detrimental components in exhaust gas.

Heretofore, the two-lobed and three-apexed rotary piston internal combustion engine having a fuel injection nozzle and an ignition plug in a first combustion chamber provided on the outside of a trochoidal inner peripheral surface thereof was proposed in U.S. Pat. No. 3,387,595, and other many references known per se. These are all devised for the purpose of improving the engine performance, but does not considered at all, unburned detrimental components in exhaust gas which becoming at present, one cause of air pollution in the world. Therefore, a great deal of unburned detrimental components such as NOx, HC, CO are contained in the exhaust gas of the conventional rotary piston internal combustion engine of this type.

It is an object of the present invention to provide a rotary piston internal combustion engine which abruptly reduces unburned detrimental components in the exhaust gas.

It is another object of the present invention to provide a two-lobed and three-apexed rotary piston internal combustion engine of the Wankel type which has a first combustion chamber communicating by means of a passage means with a second combustion chamber formed between a trochoidal inner peripheral surface and a side surface of a rotary piston, said first combustion chamber being formed on the outside of said trochoidal inner peripheral surface, a fuel injection nozzle and an ignition plug provided in said first combustion chamber, said passage means opening onto said trochoidal inner peripheral surface in the range of 15° before the junction of the two arcuates on said trochoidal inner surface to 30° after the junction at a rotary angle of an eccentric shaft for the purpose of reducing unburned detrimental components such as NOx, HC, CO, particularly NOx in the exhaust gas.

It is a further object of the present invention to provide a rotary piston internal combustion engine in which the volume of the first combustion chamber is 35 to 65% of the sum of both said combustion chambers at engine TDC for reducing unburned detrimental components, particularly HC in the exhaust gas with lessening the decrease of the engine performance as much as possible.

It is still another object of the present invention to provide a rotary piston internal combustion engine in which the sectional area of said passage means is 0.3 to 2.4% of the surface area of one side surface of the rotary piston for reducing unburned detrimental components in the exhaust gas and preventing the increase of the fuel consumption and the abnormal combustion in the first combustion chamber.

It is still another object of the present invention to provide a rotary piston internal combustion engine in which said passage means is composed of one duct for reducing unburned detrimental components, particularly HC in the exhaust gas and for improving the durability of the engine.

These and other objects, features and advantages of the present invention will become more apparent from the following description taken in conjunction with the accompanying drawings, in which:

The FIGURE is a sectional view of one embodiment of the rotary piston internal combustion engine according to the present invention.

Reference is now made to the drawing, which shows one embodiment of the present invention.

A triangular rotary piston 5 is eccentrically supported by an eccentric shaft or power output shaft 16 in a cavity 4 of a casing formed with a radial rotor housing 2 having a trochoidal inner peripheral surface 1 and side housings, each having an end wall 3 and provided at both sides thereof, and the respective strokes of air intake, compression, explosion and exhaust are conducted by changing the volume of each working chamber while moving in planetary motion in the direction as designated by an arrow in the drawing.

Said trochoidal inner peripheral surface 1 is of two lobe type connecting two arcuates, and the point that these two arcuates cross is a junction, and the line AB connecting two junctions and the center A of the eccentric shaft 16 is a short axis of the cavity 4.

Said casing 4 has an intake port 6 for intaking fresh air and an exhaust port 7 for discharging exhaust gas.

Said rotary piston 5 has three side flanks 8 and three apexes 9' and substantially flat end faces at opposite ends, each of said apexes and flat end faces have apex seal and sealing members respectively engaging the inner surfaces of said casing to form between the rotary piston and the housing a plurality of working chambers.

A first combustion chamber 10 is provided within the casing, radially outside of the trochoidal inner peripheral surface 1 near the short axis AB, and a fuel injection nozzle 11 and a spark plug 12 are provided in the first combustion chamber 10.

A passage means 13 for communicating said first combustion chamber 10 with the working chamber or second combustion chamber at the exploding stroke is provided on the short axis AB by a sectional circular duct.

Said first combustion chamber has 50% of the volume of the sum of said first combustion chamber 10 and second combustion chamber at the top dead center of the engine.

According to the above constitution, since the apex seal 9 at the trailing side crosses the port 14 of the passage means 13 before the apex seal 9 at leading side reaches the exhaust port 7, the combustion gas is not completely taken out from the first combustion chamber 10, and is retained in the same. Then, new air is intaken thereinto, and is compressed, and fuel is supplied from the fuel injection nozzle 11 thereinto, and is ignited, but when the apex seal 9 passes the port 14 of the passage means 13, the pressure of the compression stroke and exhaust stroke in the working chambers becomes substantially the same, and accordingly the retained combustion gas is not taken out from the first combustion chamber 10, but becomes the state of internal exhaust gas recirculation (EGR) or self internal exhaust gas recirculation so that NOx becomes extremely reduced. The pressure of the working chamber of compression and exhaust strokes become the same near or at 5° after the short axis, and when the port 14 of the passage means 13 is opened thereat, the exhaust amount of NOx is at minimum. Further, since the combustion occurs in the first combustion chamber 10 in the structure, there is nearly complete combustion with the result that HC and CO are reduced. When retained HC and CO in the combustion gas is taken into the second combustion chamber from the passage means 13, they are reacted with new air in the second combustion chamber to be reduced further. Since the passage means 13 is composed of one duct, it is difficult that the air introduced into the first combustion chamber is taken into the second combustion chamber, and accordingly it is rare case that the supplied fuel is leaked as present HC before the combustion gas is taken out. Moreover, since the port 15 of the passage means 13 is feasible to be coated with flame at the initial moment of the ignition, HC is prevented from leaking from the first combustion chamber 10 by way of flame propagation. Cooling of the wall surface of passage means becomes easy, and the durability of the engine becomes improved.

Since the position of the air intake port 6 is so constructed that the apex seal 9 at the trailing side closes off the intake port 6 before the apex seal 9 at the leading side passes the passage means 13, the filling amount of the new air is not decreased with the performance of the engine not decreased. If the combustion gas is ejected into the working chamber of the air intake stroke in the state that the air intake of port 6 is opened, the intake air is prevented so that the filling amount of new air is decreased.

Since the position of the exhaust port 7 is so constructed that the apex seal 9 at the trailing side crosses the passage means 13 before the apex seal at the leading side opens the exhaust port 7, the effect of scavenging is low, and the reduction of NOx is effective.

As shown by the rotary piston drawn by the one dot broken line in the FIGURE, if the passage means is located from 5° to 10° after the short axis so that the apex seal at the trailing side crosses the passage means immediately after the apex seal at the leading side opens the exhaust port, the exhaust gas in the chamber of the exhaust stroke is discharged slightly from the exhaust port so that the pressure in the chambers of the compressing and exhaust strokes becomes the same and the effect of scavenging by the exhaust is almost not taken place with the result that it is most effective for reducing NOx.

The present invention is not limited only to the above embodiment, and as clear from the following experiments and their data, the opening position of the passage means onto the trochoidal inner peripheral surface is sufficiently effective in the range of 15° before the short axis to 30° after the short axis at the rotary angle of the eccentric shaft, that is, output shaft 16.

TEST

Engine: Rotary piston internal combustion engine (two rotary piston) of this invention
Displacement of engine: 573cc × 2
Volume of first combustion chamber = 50% of the sum of the first and second combustion chambers at top dead center of the engine
Diameter of passage means: 12$^\phi$mm
Area of passage means: 0.9% of surface area of one side flank of rotary piston Test Procedure: conducted according to the order of the Text of the 1372 second mode of Federal Test Procedure defined in U.S. Federal Register.

Table 1:

| Comparison of Emission by the opening position of passage means with the Power of Engine at 2,000 rpm | | | | |
|---|---|---|---|---|
| Emission Opening position of rotary angle of power shaft | Nox g/mile | Total HC g/mile | CO g/mile | PS |
| 20° before short axis | Mode running impossible | | | 12 |
| 18° before short axis | 0.80 | 7.0 | 30 | 14 |
| 15° before short axis | 0.35 | 3.6 | 20 | 23 |
| 10° before short axis | 0.31 | 2.2 | 19 | 25 |
| 5° before short axis | 0.29 | 1.5 | 17 | 29 |
| On short axis | 0.25 | 0.9 | 8 | 32 |
| 5° after short axis | 0.24 | 1.0 | 10 | 31 |
| 10° after short axis | 0.25 | 1.0 | 10 | 31 |
| 15° after short axis | 0.32 | 3.5 | 25 | 27 |
| 20° after short axis | 0.53 | 5.0 | 30 | 25 |
| 30° after short axis | 0.65 | 5.5 | 30 | 22 |
| 35° after short axis | 0.90 | 7.0 | 45 | 14 |
| 40° after short axis | Mode running impossible | | | |

The selection of the opening position of the passage means is a factor for most effectively reducing NOx particularly difficult in post treatment. Since combustion gas is retained in the first combustion chamber in considerably high pressure if the passage means is opened at the air intake port side from 15° before the short axis, it may flow a great deal to the working chamber of the air intake stroke at low pressure. For such reason, the scavenging in the first combustion chamber becomes good so that the effect of the internal exhaust gas recirculation becomes less. Thus, the exhaust amount of NOx becomes great so that it is not good for the purpose of reducing unburned detrimental components in the exhaust gas. In such case, since the combustion gas of high pressure flows out opposite on the rotary direction, it may act to the rotary piston as a counter torque to reduce the efficiency and the engine performance. An abnormal combustion may take place by the flow of retained combustion gas. Since the apex seal at the leading side is already passed the exhaust port if it is opened at the exhaust port side from 30° after the short axis, the first combustion chamber becomes the state where it communicates perfectly with the exhaust and port, the scavenging becomes very good. For such reason, the effect of the internal exhaust gas recirculation becomes substantially less so that the exhaust amount of NOx is abruptly increased. The nearer the port 14 approaches to the exhaust port side, the more the compression ratio is decreased so that the filling capacity is decreased together with the reduction of the filling time to decrease the engine performance.

Thus, the effect of the scavenging is low in the range of 15° before the short axis to 30° after the short axis so that it is effective for the reduction of NOx. Further, the effect of the scavenging is very low in the range from the short axis to 10° after the short axis so that it is most effective for reduction of NOx.

It is preferable that the volume of said combustion chamber is 35 to 65% of the sum of the first and second combustion chambers at top dead center of the engine. If it is less than 35% thereof, the engine performance, that is, power is decreased. If it is over 65% engine performance is lowered by the decrease of the compression ratio.

Then, the sectional area of the passage means is preferably 0.3 to 2.4% of the surface area of one side flank of the rotary piston. If the sectional area of the passage means is less than 0.3%, the pressure increase due to the combustion in the first combustion chamber becomes large, abnormal combustion such as knocking may take place, and the passage means may become an orifice so that the fuel consumption is increased by the loss of the exploding pressure. Further, it is expected to increase CO by the deterioration of the intake and exhaust of the gas. If the sectional area of the passage means is larger than 2.4%, the combustion gas is leaked from the first combustion chamber so that there becomes no difference from the conventional rotary piston engine having no first external combustion chamber with the result that S/V ratio becomes large and a great deal of HC is discharged.

This invention thus constructed abruptly reduces the unburned detrimental components in the exhaust gas, and yet greatly decreases the reduction of the engine performance. However, in cases that large torque is required such as in acceleration, travelling up on a steep ascent, high speed driving, there may be provided means for supplying an additional fuel such as, for example, carburetor 17 or an additional fuel injection nozzle 18 as designated by one dot broken line in the FIGURE, or an ignition plug 19 provided in the second combustion chamber. However, in the engine of the type for supplying an additional fuel, when the passage means is opened at 15° before the short axis, combustion gas in the first combustion chamber is ejected into the second combustion chamber at a compression stroke of low pressure, so that it ignites the unburned mixture gas filled therein. For such reason, the engine becomes impossible in operation. If the passage means is opened near at 10° before the short shaft, such impossibility of the engine operation is eliminated.

What we claim is:

1. In a two lobed and three apexed rotary piston internal combustion engine of the Wankel type comprising a housing having a rotor housing having trochoidal inner peripheral surface and side housings having an end wall provided at both sides thereof, a cavity formed by said side housing end walls and said trochoidal inner peripheral surface, said housing being formed with spaced intake and exhaust ports, a rotary piston having three side flanks and eccentrically rotatably mounted on a power output shaft within said cavity, said rotary piston having three circumferentially spaced apexes and substantially flat end faces at opposite ends thereof, each of said apexes and flat end faces having sealing members engaging the inner housing surfaces of said cavity to form between said rotary piston and said housing a plurality of working chambers, a first combustion chamber provided in said housing outside of said trochoidal inner peripheral surface, one of said working chambers forming a second combustion chamber at the exploding stroke, a fuel injection nozzle and a spark plug provided in said first combustion chamber, the improvement comprising: said first combustion chamber having a volume of 35 to 65% of the sum of the volume of the first combustion and second combustion chambers at engine top dead center, a passage means communicating between said first combustion and second combustion chambers, said passage means opening into said trochoidal inner peripheral surface at a rotary angle in the range of the short axis to 10° after the short axis as defined by the rotary shaft and the intersection of the two arcuate portions of said trochoidal inner surface, and whereby said passage means is located relative to said intake port such that the intake port is closed off to one of the working chambers by the rotary piston, prior to the leading side apex seal for that chamber opening that chamber to said passage means, said passage means being located circumferentially relative to said exhaust port such that the trailing side apex seal for a given working chamber just crosses over the opening of the passage means to that working chamber as the leading side apex seal relative to that working chamber begins to open the exhaust port, and said passage means comprises a single duct having a cross sectional area smaller than that of said combustion chamber, said cross sectional area being 0.3 to 2.4% of the area of the surface of one of said three side flanks of said rotary piston.

2. A rotary piston internal combustion engine as claimed in claim 1, further comprising a fuel supplying means for supplying additional fuel to said working chamber.

3. A rotary piston internal combustion engine as claimed in claim 2, wherein said second combustion chamber has a fuel injection nozzle and a spark plug provided therein.

4. A rotary piston internal combustion engine as claimed in claim 3, wherein said fuel injection nozzle and said spark plug in said second combustion chamber are located on opposite sides of said second combustion chamber.

* * * * *